US012760761B2

(12) United States Patent
Omli

(10) Patent No.: US 12,760,761 B2
(45) Date of Patent: Oct. 13, 2026

(54) REVERSIBLE FASTENER CAP

(71) Applicant: SMART8, LLC, Bonaire, GA (US)

(72) Inventor: Douglas K. Omli, Bonaire, GA (US)

(73) Assignee: SMART8, LLC, Bonaire, GA (US)

( * ) Notice: Subject to any disclaimer, the term of this patent is extended or adjusted under 35 U.S.C. 154(b) by 462 days.

(21) Appl. No.: 18/505,381

(22) Filed: Nov. 9, 2023

(65) Prior Publication Data

US 2024/0240665 A1 Jul. 18, 2024

Related U.S. Application Data

(60) Provisional application No. 63/479,828, filed on Jan. 13, 2023.

(51) Int. Cl.
*F16B 43/00* (2006.01)
*F16B 15/00* (2006.01)

(52) U.S. Cl.
CPC .............. *F16B 43/00* (2013.01); *F16B 15/00* (2013.01)

(58) Field of Classification Search
CPC .......... F16B 43/00; F16B 15/00; F16B 15/08; F16B 37/14; E04D 2014/045
USPC .................................... 411/531, 371.1, 371.2
See application file for complete search history.

(56) References Cited

U.S. PATENT DOCUMENTS 1,143,091 A * 6/1915 Stimpson ................ F16B 43/00 411/545
2,137,467 A * 11/1938 Vogel ...................... F16B 15/08 206/813
2,941,105 A * 6/1960 Rickenbach ............ H01T 13/08 411/936
3,212,635 A * 10/1965 Dreyfus ............. B65D 73/0035 206/497
3,294,303 A * 12/1966 Anstett ................... B25C 1/005 206/343
3,812,961 A * 5/1974 Merrick .................. F16B 27/00 206/338
D236,428 S * 8/1975 Stewart et al. ................ D8/382
4,273,973 A 6/1981 Bruins et al.
D263,927 S * 4/1982 Dewey ........................... D8/399
D263,928 S * 4/1982 Dewey ........................... D8/399
D275,076 S * 8/1984 Bowen .......................... D11/102
D275,077 S * 8/1984 Bowen .......................... D11/102
4,576,591 A * 3/1986 Kaye ................. A61M 37/0069 206/343
4,718,551 A * 1/1988 Whitledge .............. F16B 27/00 206/820
4,890,968 A * 1/1990 Beach ................... E04D 3/3603 405/259.1
5,407,313 A * 4/1995 Bruins .................... E04D 5/145 411/542

(Continued)

FOREIGN PATENT DOCUMENTS

CN 2371385 3/2000
CN 107651235 7/2016

*Primary Examiner* — Kristina R Fulton
(74) *Attorney, Agent, or Firm* — Shumaker, Loop & Kendrick, LLP

(57) ABSTRACT

A fastener cap includes a web with opposed top and bottom faces, the web bounded by a peripheral flange, wherein the peripheral flange includes: a planar top surface; and a planar bottom surface which is spaced away from and parallel to the planar top surface. A strip, includes a plurality of the fastener caps disposed in a linear array and joined by flexible tabs.

18 Claims, 14 Drawing Sheets

(56) References Cited

U.S. PATENT DOCUMENTS 5,529,451 A * 6/1996 Bruins .................... E04D 5/145 411/441
5,775,514 A * 7/1998 Lin ........................ B65D 11/20 206/343
5,947,362 A 9/1999 Omli
6,036,013 A * 3/2000 Chen ....................... F16B 27/00 206/347
6,116,835 A * 9/2000 Blacket ................... B25C 1/003 411/443
6,293,744 B1 * 9/2001 Hempfling ............. F16B 37/14 411/372.5
6,478,209 B1 11/2002 Bruins et al.
6,550,660 B1 4/2003 Chlebowski et al.
6,640,968 B2 * 11/2003 Selle ....................... F16B 21/20 206/338
6,736,303 B2 5/2004 Bruins et al.
D495,245 S * 8/2004 Kuhn ............................ D8/389
6,779,700 B2 * 8/2004 Bruins .................... B25C 1/006 227/18
D497,102 S * 10/2004 Kuhn ............................ D8/389
6,811,366 B2 * 11/2004 Chen ....................... F16B 43/00 206/346
6,814,231 B2 * 11/2004 Gupta ..................... F16B 15/08 411/443
6,968,945 B2 11/2005 Bruins et al.
D522,857 S 6/2006 Tabeshnekoo
7,207,095 B2 * 4/2007 Bruins .................... F16B 15/08 206/343
7,207,762 B2 * 4/2007 Teal ...................... F16B 37/065 411/113
7,232,050 B2 6/2007 Omli
7,290,659 B1 * 11/2007 Chou .................... B25C 5/1693 206/445
7,344,058 B2 3/2008 Bruins et al.
7,481,346 B2 1/2009 Vanden Berg et al.
7,506,789 B2 3/2009 Shor
7,530,483 B2 5/2009 Bruins et al.
D593,391 S * 6/2009 Lamb ............................... D8/71
7,628,305 B2 * 12/2009 Vanden Berg ........ B25C 5/1693 227/135
7,654,389 B2 * 2/2010 Vogrig ................... B21J 15/323 206/820
7,836,970 B2 * 11/2010 Bruins ...................... B25C 7/00 173/1
8,033,394 B2 * 10/2011 Nakagawa ............. F16B 15/08 411/443
D662,808 S 7/2012 Vandenberg
8,382,414 B2 2/2013 Vandenberg
D677,147 S 3/2013 Vandenberg
8,480,343 B2 7/2013 Vandenberg
D693,210 S 11/2013 Vandenberg
8,616,818 B2 * 12/2013 Travis ................... F16B 41/002 411/533
8,672,204 B2 3/2014 Vandenberg
D704,018 S 5/2014 Vandenberg
8,747,043 B2 6/2014 Vandenberg
8,925,644 B2 1/2015 Vandenberg
8,955,210 B2 2/2015 Vandenberg
8,985,927 B2 * 3/2015 Ashton ............... F16B 15/0053 206/346
9,051,726 B2 6/2015 Vandenberg
9,120,214 B2 9/2015 Vandenberg
9,144,896 B2 9/2015 Vandenberg
D742,730 S * 11/2015 Vandenberg ................... D8/382
9,222,269 B2 12/2015 Bruins
9,751,197 B2 9/2017 Vandenberg
9,784,296 B2 10/2017 Vandenberg
9,802,300 B2 10/2017 Vandenberg
9,915,282 B2 * 3/2018 Lamb ...................... F16B 43/00
9,932,744 B2 4/2018 Vandenberg
10,093,476 B2 * 10/2018 Vogrig ...................... B25C 1/00
10,138,919 B2 * 11/2018 Mathieson ................ E04D 1/34
D842,086 S 3/2019 Vandenberg
10,220,497 B2 3/2019 Vandenberg
D850,897 S 6/2019 Vandenberg
D850,898 S 6/2019 Vandenberg
10,315,295 B2 6/2019 Vandenberg
D853,829 S 7/2019 Vandenberg
10,358,825 B2 * 7/2019 Omli ......................... B27F 7/17
10,378,218 B2 8/2019 Vandenberg
10,414,030 B2 9/2019 Vandenberg
10,421,176 B2 9/2019 Vandenberg
10,576,612 B2 3/2020 Vandenberg
D883,765 S 5/2020 Schwartzkopf
D888,544 S 6/2020 Schwartzkopf
10,675,740 B2 6/2020 Burlingame et al.
10,731,695 B2 * 8/2020 Lamb ...................... F16B 43/00
10,816,025 B1 * 10/2020 Su ........................... B25B 23/02
10,850,373 B2 12/2020 Vandenberg
10,914,075 B2 2/2021 Vandenberg et al.
10,960,525 B2 3/2021 Vandenberg
D924,044 S 7/2021 Vandenberg et al.
11,111,679 B2 9/2021 Vandenberg et al.
11,149,445 B2 10/2021 Vandenberg et al.
11,162,526 B2 * 11/2021 Su ........................... F16B 27/00
D945,870 S 3/2022 Vandenberg
11,261,893 B2 3/2022 Vandenberg et al.
11,305,407 B2 4/2022 Vandenberg
12,162,669 B2 * 12/2024 Vogrig ....................... B21J 5/06
D1,085,366 S * 7/2025 Lin .............................. D23/269
D1,103,764 S * 12/2025 Lamb ............................. D8/382
2003/0002950 A1 * 1/2003 Jameson ................. F16B 31/02 411/3
2003/0057248 A1 3/2003 Bruins et al.
2004/0179919 A1 * 9/2004 Chen ....................... F16B 27/00 411/443
2005/0135896 A1 * 6/2005 Teal ...................... F16B 37/065 411/183
2005/0265807 A1 * 12/2005 Bruins .................... F16B 15/08 411/480
2009/0050664 A1 * 2/2009 Henza ..................... F16B 15/08 227/16
2009/0223023 A1 * 9/2009 Daniels ................... F16G 3/003 24/38
2011/0100848 A1 * 5/2011 Busch ..................... F16B 27/00 206/338
2012/0213611 A1 * 8/2012 Travis ..................... F16B 43/00 411/372
2013/0087023 A1 4/2013 Vandenberg
2013/0259602 A1 * 10/2013 Yao ......................... F16B 15/08 411/443
2013/0259603 A1 * 10/2013 Yao ......................... F16B 43/00 411/443
2013/0259605 A1 * 10/2013 Yao ......................... F16B 43/00 411/532
2013/0330150 A1 * 12/2013 Lamb ...................... F16B 43/00 411/531
2015/0322995 A1 * 11/2015 Omli ....................... F16B 43/00 411/371.1
2017/0218997 A1 * 8/2017 Mathieson .......... F16B 15/0092
2018/0163406 A1 * 6/2018 Omli ........................ F16J 15/02
2018/0202483 A1 * 7/2018 Lamb ...................... F16B 43/00
2020/0362570 A1 11/2020 Vandenberg et al.
2021/0178562 A1 6/2021 Vandenberg
2021/0277668 A1 9/2021 Vandenberg et al.
2021/0363761 A1 11/2021 Vandenberg et al.
2021/0404190 A1 12/2021 Vandenberg et al.
2022/0136547 A1 5/2022 Vandenberg et al.
2022/0176525 A1 6/2022 Vandenberg
2022/0333635 A1 * 10/2022 Colyn ................... F16B 41/005
2024/0240665 A1 * 7/2024 Omli ....................... F16B 43/00

* cited by examiner

REVERSIBLE FASTENER CAP

This invention relates generally to fasteners, and more particularly to fastener caps.

BACKGROUND

Fastener caps are typically small disks used underneath the head of a fastener such as a nail or staple to spread out the fastener load and prevent pull-through and tear out of substrate materials.

Some fastener caps are manufactured with a fastener already inserted. These are typically used for hand installation using a hammer.

Other fastener caps are manufactured without a fastener already inserted. These are used in air powered tools or manual tools (e.g., staplers, nailers, or drivers) that store a supply of the fastener caps and a separate supply of fasteners. In use, the tool drives a fastener through one of the fastener caps into the substrate, securing both the fastener and the cap.

One problem with prior art fastener caps is that they typically have a dish-like shape which is not symmetrical top to bottom. When arranged for storage, typically by rolling onto a spool, they are not reversible. Because some tools invert the caps during the process of unloading them from a roll, this means that prior art fastener caps must be packaged for a particular branded tool and are not universally usable.

BRIEF SUMMARY OF THE INVENTION

This problem is addressed by a fastener cap and a strip of fastener caps which are reversible.

According to one aspect of the technology described herein, a fastener cap includes a web with opposed top and bottom faces, the web bounded by a peripheral flange, wherein the peripheral flange includes: a planar top surface; and a planar bottom surface which is spaced away from and parallel to the planar top surface.

According to another aspect of the technology described herein, a strip of fastener caps includes a plurality of fastener caps disposed in a linear array and joined by flexible tabs, each fastener cap including: a web with opposed top and bottom faces respectively, bounded by a peripheral flange, wherein the peripheral flange includes: a planar top surface; and a planar bottom surface which is spaced away from and parallel to the planar top surface.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
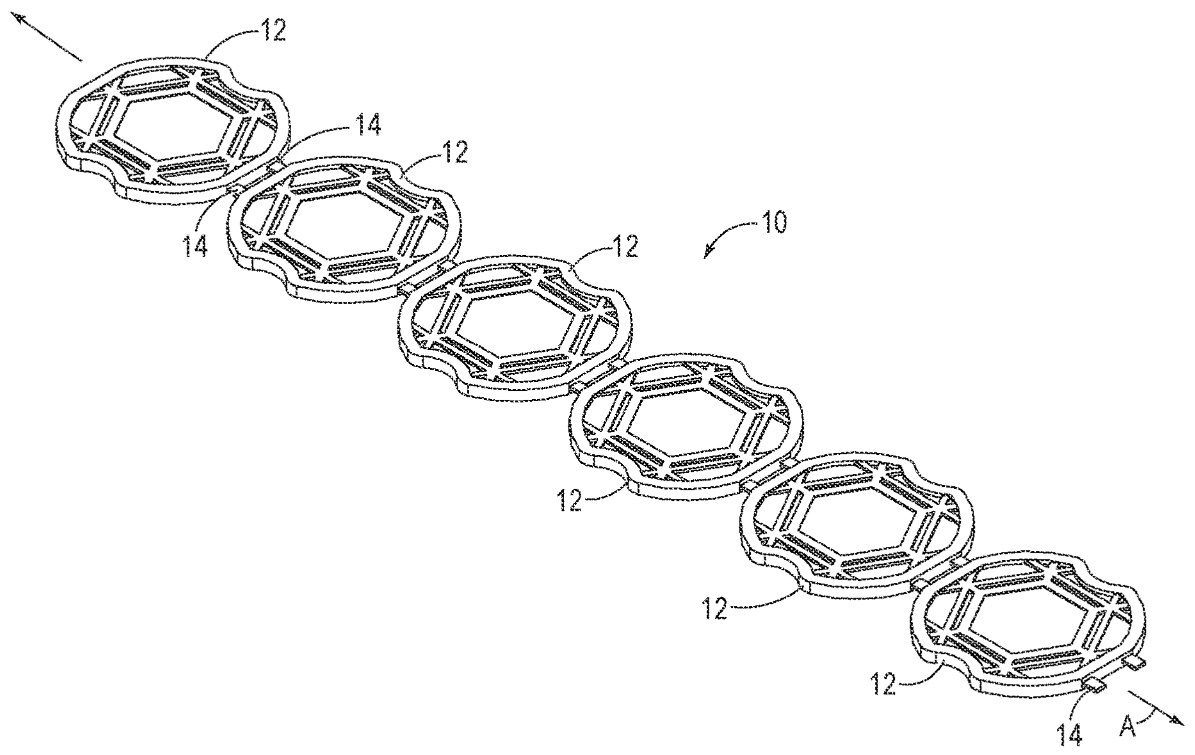
FIG. 1 is a perspective view of an exemplary strip of fastener caps.
Figure 2:
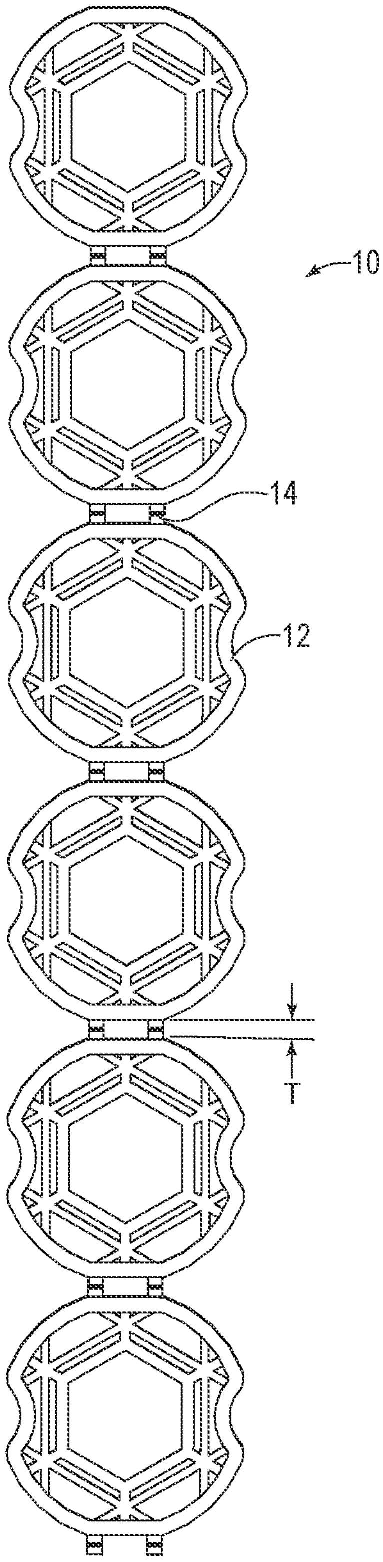
FIG. 2 is a top plan view of the strip of FIG. 1.
Figure 3:
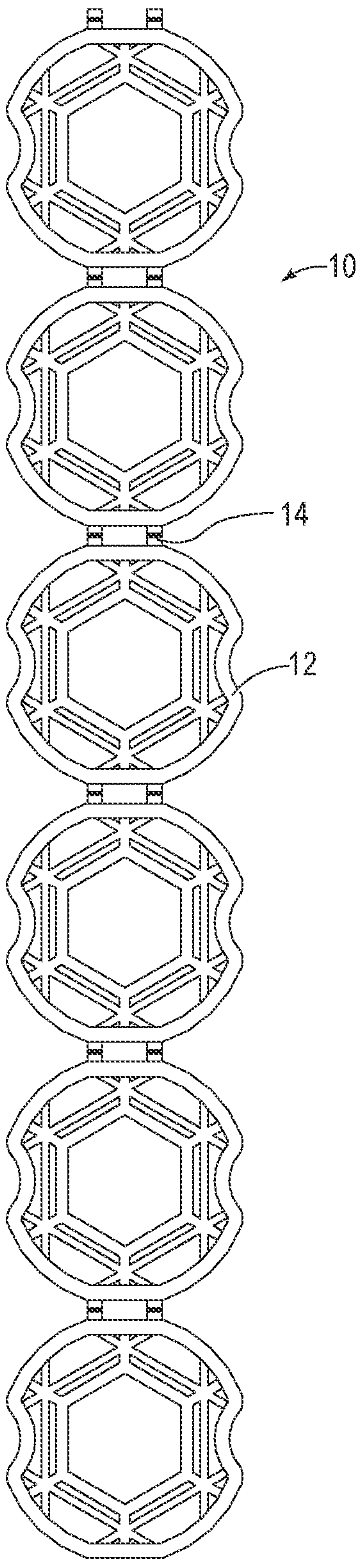
FIG. 3 is a bottom plan view of the strip of FIG. 1.

Referring to the drawings wherein identical reference numerals denote the same elements throughout the various views, FIGS. 1-5 depict an exemplary strip 10 comprising a plurality of fastener caps 12 disposed in a linear array and interconnected by tabs 14. The strip 10 extends along a main axis "A".

The fastener caps 12 and the strip 10 may be constructed of any material having sufficient strength to resist anticipated fastener loads in use. Examples of suitable materials include plastics which are inexpensive, lightweight, easily formed, and environmentally resistant.

Specific examples of suitable plastics include polyethylene ("PE") and polypropylene ("PP").

The strip 10 (comprising the fastener caps 12 and the tabs 14) may be formed as one integral, unitary, or monolithic body. While any suitable manufacturing method may be used, the fastener caps 12 and strip 10 are especially suitable for molding processes such as injection molding.

Figure 4:
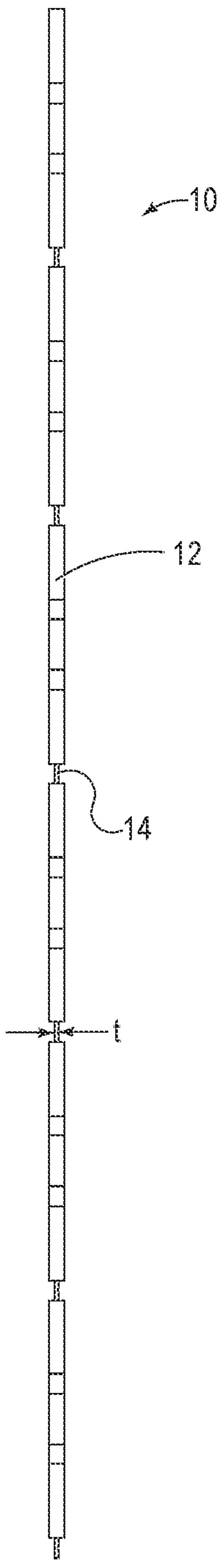
FIG. 4 is a left side elevation view of the strip of FIG. 1.
Figure 5:
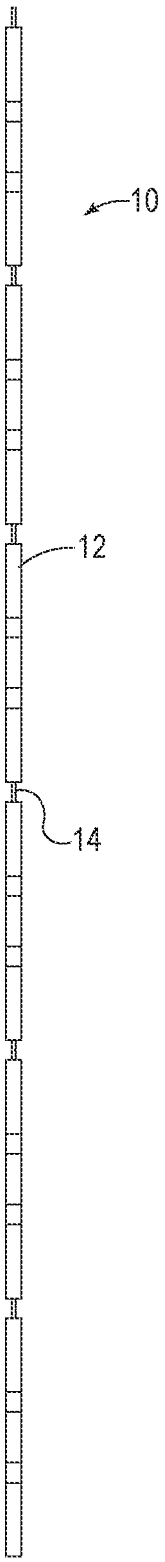
FIG. 5 is a right side elevation view of the strip of FIG. 1.
Figure 6:
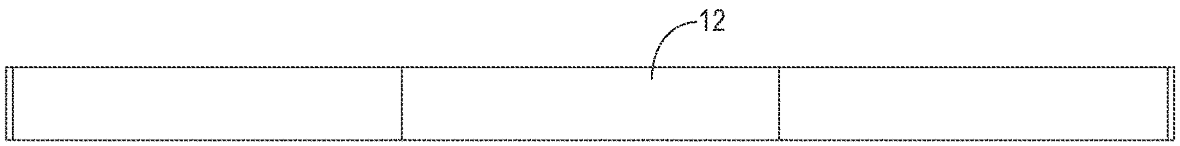
FIG. 6 is a front elevation view of the strip of FIG. 1.
Figure 7:
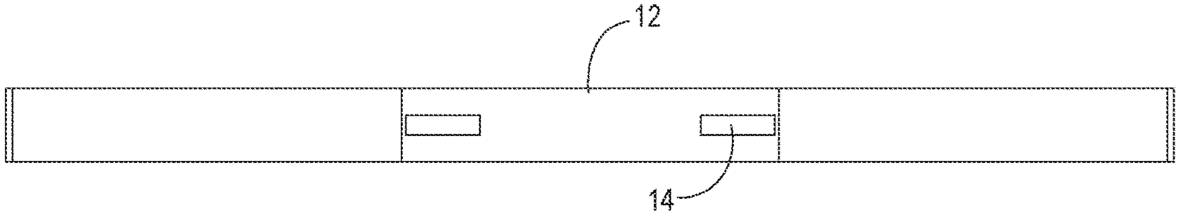
FIG. 7 is a rear elevation view of the strip of FIG. 1.
Figure 8:
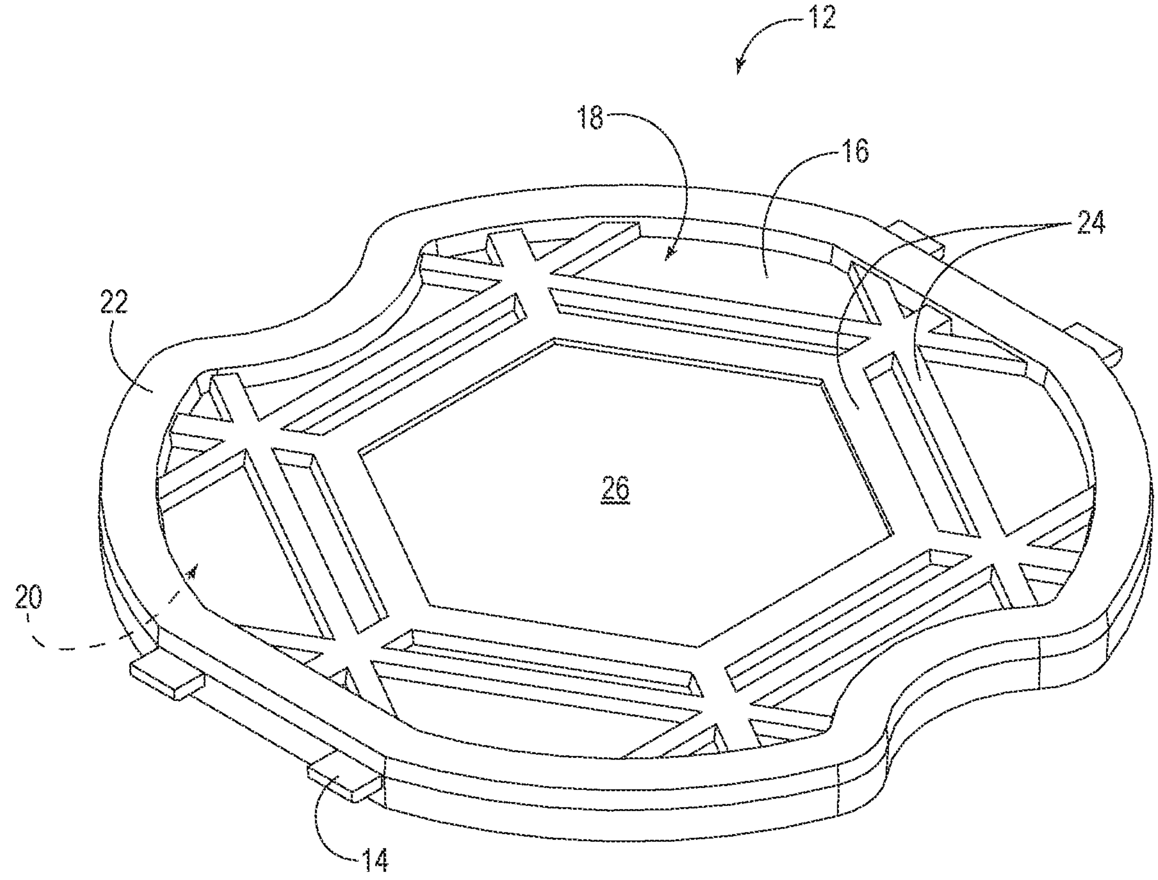
FIG. 8 is a perspective view of a single fastener cap.
Figure 9:
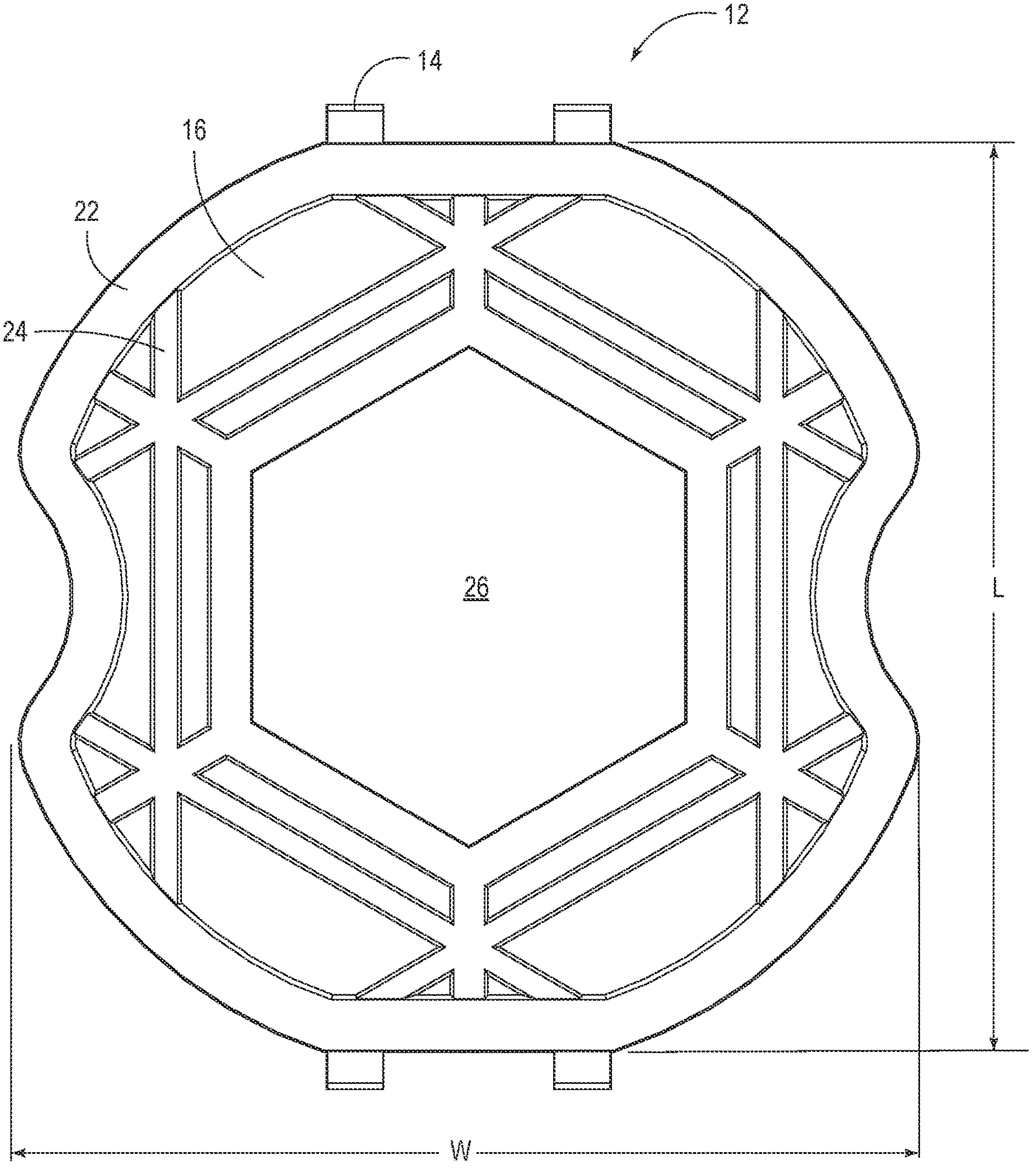
FIG. 9 is a top plan view of the fastener cap of FIG. 8.
Figure 10:
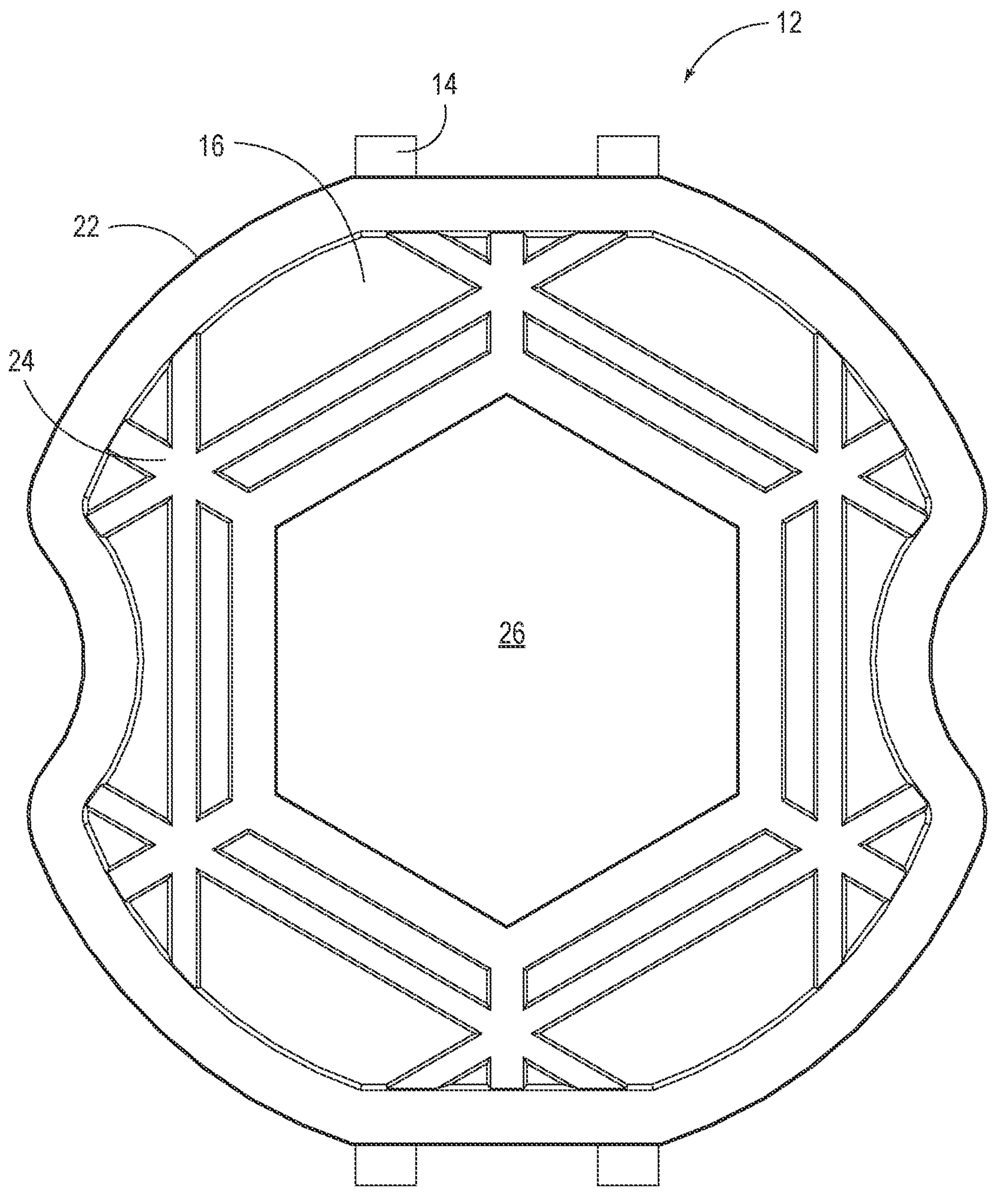
FIG. 10 is a bottom plan view of the fastener cap of FIG. 8.
Figure 11:
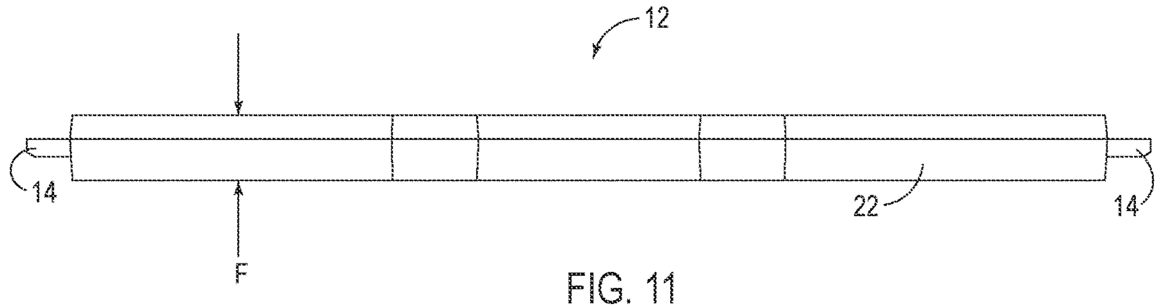
FIG. 11 is a left side elevation view of the fastener cap of FIG. 8.
Figure 12:
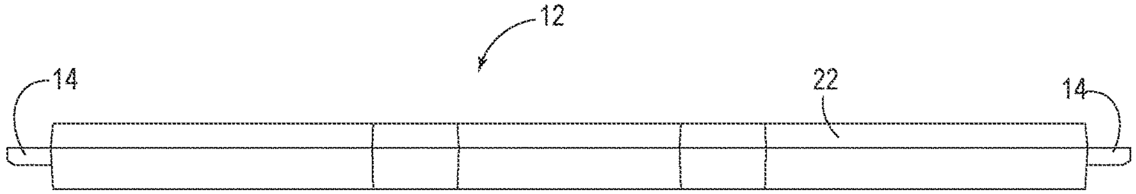
FIG. 12 is a right side view of the fastener cap of FIG. 8.
Figure 13:
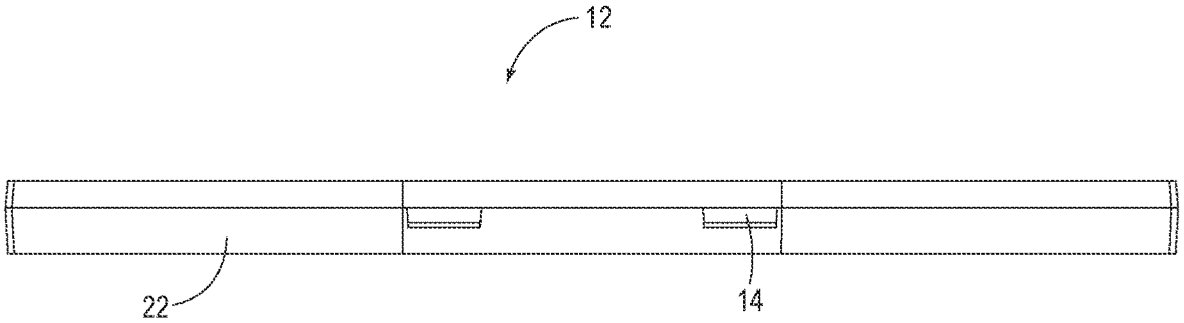
FIG. 13 is a front elevation view of the fastener cap of FIG. 8.
Figure 14:
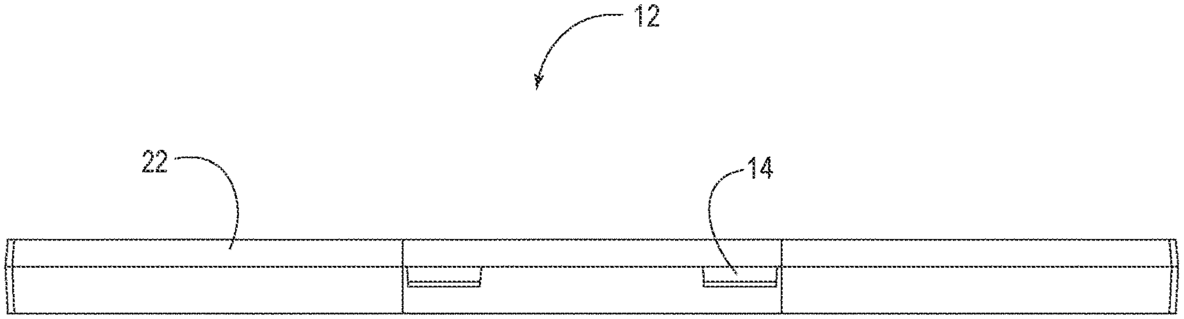
FIG. 14 is a rear elevation view of the fastener cap of FIG. 8.

The tabs 14 are sized to provide adequate strength to hold the fastener caps 12 together, while permitting them to be rolled up for storage, and while being easily cut or broken apart to separate the fastener caps 12 during the installation process. In one example, the tabs 14 may have a length "T" of approximately 2 mm (FIG. 2), and a thickness "t" of approximately 0.4 mm (FIG. 4). In the illustrated example, a pair of spaced-apart tabs 14 extend between each adjacent pair of fastener caps 12.

FIGS. 8-16 illustrate an individual one of the fastener caps 12 in more detail.

The fastener caps 12 have outside dimensions suitable for spreading the load of a fastener while providing a convenient size and shape for handling and installation. In one example, the fastener cap 12 has an overall length "L", measured parallel to the strip axis A, of approximately 24 mm. In one example, the fastener cap 12 has an overall width "W", measured perpendicular to the length L, of approximately 25 mm (see FIG. 9).

Figure 17:
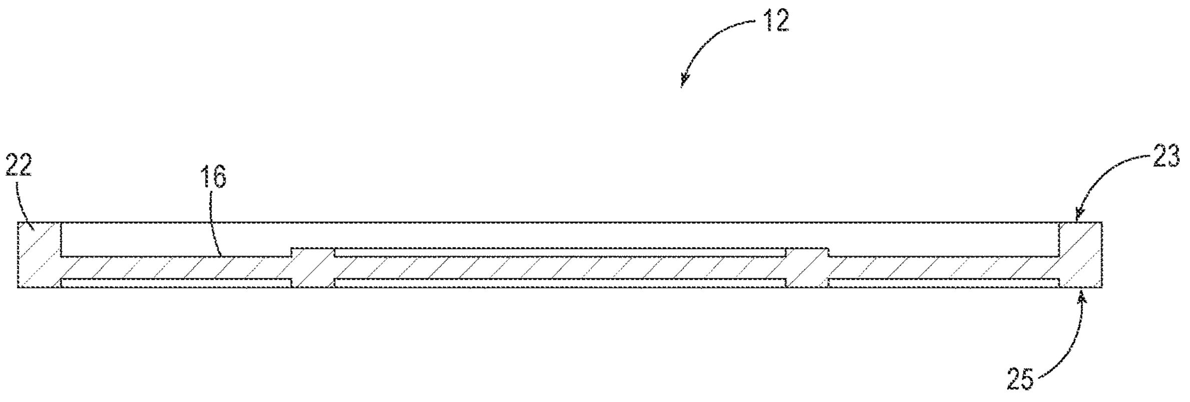
FIG. 17 is a sectioned elevation view of an alternative embodiment of a fastener cap.

The fastener cap 12 may have a structure incorporating a variable thickness, and particularly may have a web 16 with opposed top and bottom faces 18, 20 respectively, bounded by a peripheral flange 22. The peripheral flange 22 has an overall thickness greater than the thickness of the web 16. In one example, the peripheral flange 22 may have a thickness approximately three times a thickness of the web 16. In order to provide reversibility, that is, top to bottom symmetry, the peripheral flange 22 may be configured with a planar top surface 23 and a planar bottom surface 25 that is spaced-apart from the top surface 23, wherein the top and bottom surfaces 23, 25 are parallel to each other (see FIG. 15). Furthermore, the top and bottom surfaces 23, 25 may define the furthest top and bottom extents of the fastener cap 12. In one embodiment, to provide complete top to bottom symmetry, the position of the web 16 may be in the middle of the thickness of the peripheral flange 22. Stated another way, the peripheral flange 22 may protrude an equal distance from each face of the web 16. Alternatively, as seen in FIG. 17, the position of the web 16 may be located other than in the middle of the thickness of the peripheral flange 22.

Figure 15:
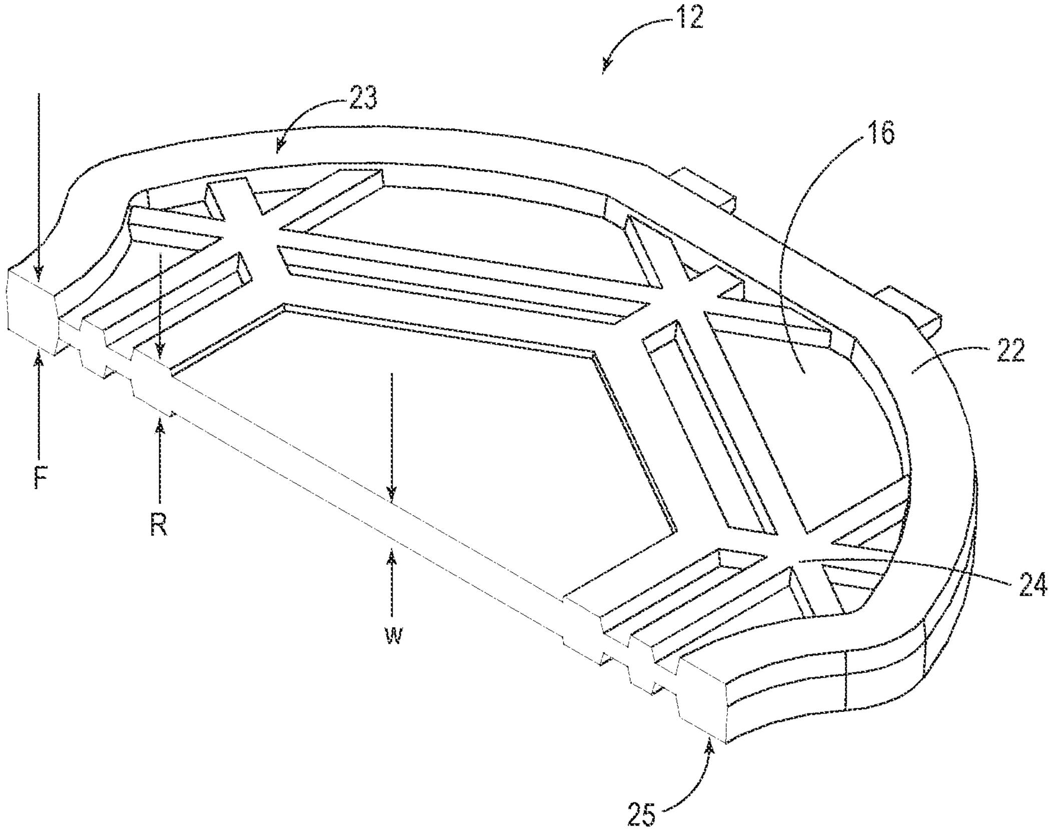
FIG. 15 is a sectioned perspective view of the fastener cap of FIG. 8.
Figure 16:
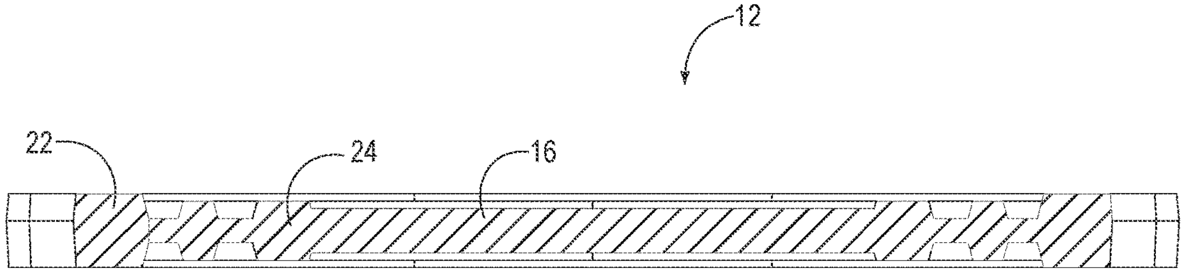
FIG. 16 is a sectioned elevation view of the fastener cap of FIG. 8.

In one example, the peripheral flange 22 may have a thickness "F" of approximately 1.5 mm (thicknesses best seen in FIG. 15). Thickness F also represents the overall maximum thickness of the fastener cap 12.

In one example, the web 16 may have a thickness "w" of approximately 0.5 mm.

In addition to the peripheral flange 22, the fastener cap 12 may incorporate stiffening members such as ribs 24 protruding from the web 16. In order to provide reversibility, that is top to bottom symmetry, the web 16 may be positioned in the middle of the thickness of the ribs 24. Stated another way, the ribs 24 may protrude an equal distance from each face of the web 16.

In one example, the overall thickness "R" of the ribs 24 may be approximately 0.9 mm.

The ribs 24 may be arranged in any pattern which provides enhanced stiffness to the web 16. In the illustrated example, the ribs 24 are arranged in a pattern forming a hexagonal shape.

The ribs 24 may be arranged so as to leave a central area 26 of the web 16 clear for penetration of a fastener.

The strip 10 of connected fastener caps 12 may be folded or rolled into a convenient shape for storage and loading into a conventional driver tool (not shown). In use, the strip 10 is pulled out, and individual fastener caps 12 are detached from the strip 10 as fasteners are driven. Because the fastener caps 12 are reversible, a roll formed from the strip 10 is suitable for use in a driver tool without regard to the top-to-bottom orientation. Stated another way, the fastener caps 12 can be successfully installed whether they are unrolled directly from the roll, or they are inverted during or after the process of being unrolled.

Figure 18:
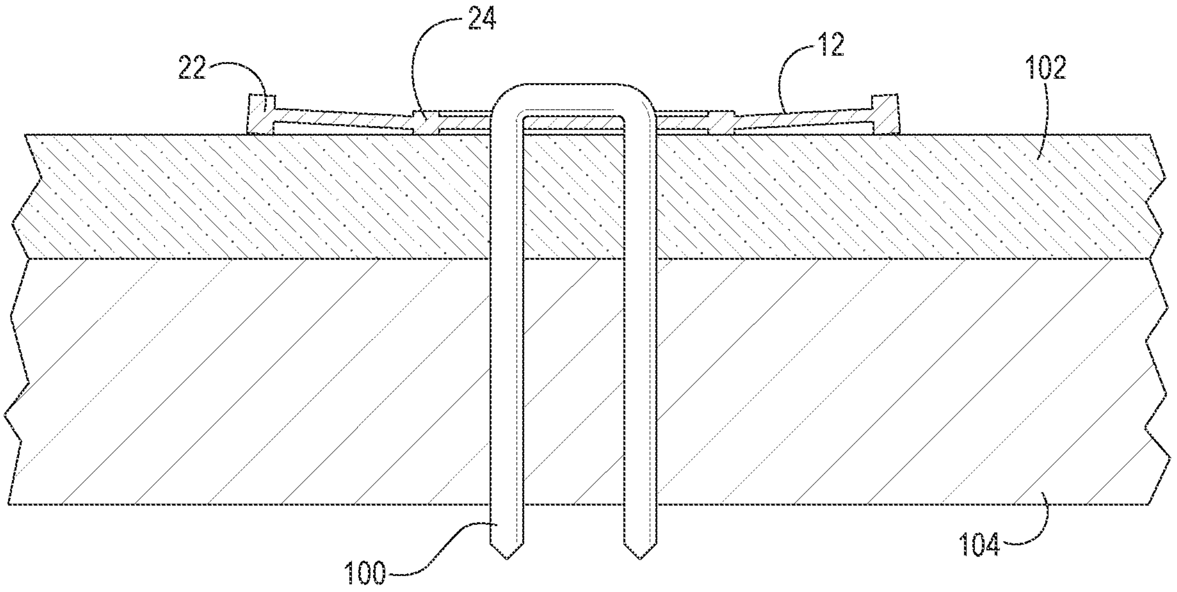
FIG. 18 is a sectional view of a substrate having a fastener cap attached thereto with a staple.

FIG. 18 shows the fastener cap 12 installed in a typical application, with a fastener 100 (e.g., a staple) driven through the fastener cap 12, a sheet of underlayment material 102, and a substrate 104.

The fastener cap 12 spreads out the point load of the fastener 100, preventing it from tearing through the shingle 102 and increasing the holding power of the fastener 100.

The peripheral flange 22 and ribs 24 of the fastener cap 12 give adequate strength and stiffness to avoid excessive buckling when driven in, while permitting the overall mass and therefore cost of the fastener 100 to be minimized.

Figure 19:
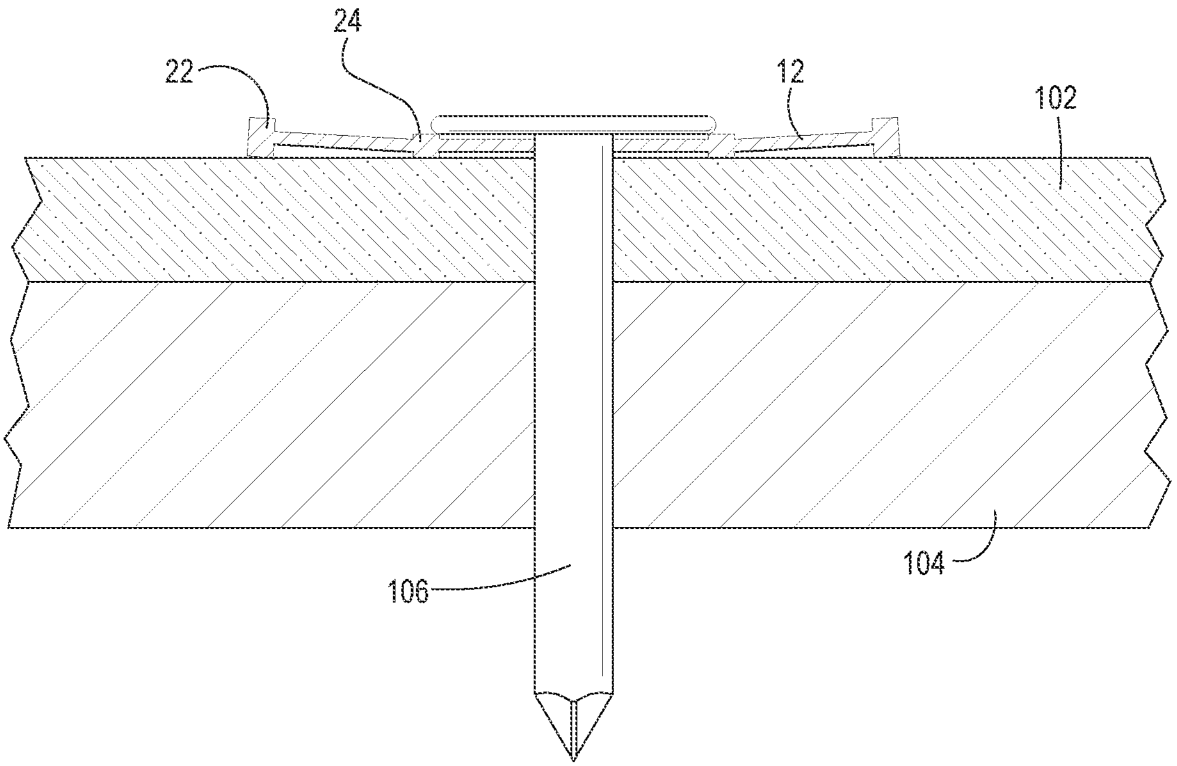
FIG. 19 is a sectional view of a substrate having a fastener cap attached thereto with a nail.

FIG. 19 shows an alternate application in which the fastener cap 12 is installed with a fastener 106 (e.g., a nail) driven through the fastener cap 12, a sheet of underlayment material 102, and a substrate 104. The function of the fastener cap 12 is the same as if installed with a staple.

The fastener cap described herein has advantages over prior art devices.

Specifically, it has the ability to be loaded in and fed from any type of prior art air powered driver tools or manual driver tools regardless of loading direction. It has no functional "top" or "bottom" that must be observed by the installer. Stated another way, it is equally suitable for use "right side up" or "upside down".

The foregoing has described a fastener cap and a method for its use. All of the features disclosed in this specification, and/or all of the steps of any method or process so disclosed, may be combined in any combination, except combinations where at least some of such features and/or steps are mutually exclusive.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends, or to any novel one, or any novel combination, of the steps of any method or process so disclosed.

What is claimed is:

1. A reversible fastener cap configured for installation underneath a head of a fastener to spread out fastener load and prevent tear out of substrate materials, the fastener cap comprising: a continuous web with opposed top and bottom faces, the web having a solid central area configured to be punctured by a fastener and being bounded by a peripheral flange, wherein the peripheral flange includes: a planar top surface; and a planar bottom surface which is spaced away from and parallel to the planar top surface, wherein a thickness of the peripheral flange is defined between the planar top surface and the planar bottom surface, and a thickness of the web is less than the thickness of the peripheral flange, such that the peripheral flange protrudes from both the top face and the bottom face of the web, wherein the fastener cap is symmetrical from the planar top surface to the planar bottom surface.

2. The fastener cap of claim 1, wherein: the web is positioned in the middle of the thickness of the peripheral flange.

3. The fastener cap of claim 1, further comprising one or more ribs protruding from the top face or the bottom face of the web.

4. The fastener cap of claim 3, wherein the one or more ribs protrude an equal distance from each of the faces of the web.

5. The fastener cap of claim 3, wherein the one or more ribs are arranged in a pattern forming a hexagonal shape.

6. The fastener cap of claim 3, wherein the one or more ribs are positioned so as to leave a central area of the web clear for penetration of a fastener.

7. The fastener cap of claim 1, wherein the cap is constructed of plastic.

8. The fastener cap of claim 1, wherein the cap is constructed of polyethylene.

9. The fastener cap of claim 1, wherein the cap is constructed of polypropylene.

10. A strip of fastener caps, comprising a plurality of reversible fastener caps disposed in a linear array and joined by flexible tabs, each fastener cap of the plurality of fastener caps being configured for installation underneath a head of a fastener to spread out fastener load and prevent tear out of substrate materials, each of the plurality of fastener caps including: a continuous web with opposed top and bottom faces, the web having a solid central area configured to be punctured by a fastener and being bounded by a peripheral flange, wherein the peripheral flange includes: a planar top surface; and a planar bottom surface which is spaced away from and parallel to the planar top surface, wherein a thickness of the peripheral flange is defined between the planar top surface and the planar bottom surface, and a thickness of the web is less than the thickness of the peripheral flange, such that the peripheral flange protrudes from both the top face and the bottom face of the web, wherein the strip of fastener caps is symmetrical from the planar top surface to the planar bottom surface.

11. The strip of fastener caps of claim 10, wherein:

the web is positioned in the middle of the thickness of the peripheral flange.

12. The strip of fastener caps of claim 10, wherein each of the fastener caps includes one or more ribs protruding from the top face or the bottom face of the web thereof.

13. The strip of fastener caps of claim 12, wherein the one or more ribs protrude an equal distance from each of the faces of the web.

14. The strip of fastener caps of claim 10, wherein the fastener caps and the tabs are constructed of plastic.

15. The strip of fastener caps of claim 10, wherein the fastener caps and the tabs are constructed of polyethylene.

16. The strip of fastener caps of claim 10, wherein the fastener caps and the tabs are constructed of polypropylene.

17. The strip of fastener caps of claim 10, wherein the fastener caps and the tabs are one unitary body.

18. The strip of fastener caps of claim 10, wherein a pair of the tabs extend between each adjacent pair of the fastener caps.

* * * * *